United States Patent [19]

Andersen

[11] 4,316,511
[45] Feb. 23, 1982

[54] IMPLEMENT FRAME, ESPECIALLY FOR AGRICULTURAL MACHINES

[75] Inventor: Helge H. Andersen, Soroe, Denmark

[73] Assignee: Kongskilde Koncernselskab A/S, Soroe, Denmark

[21] Appl. No.: 92,848

[22] Filed: Nov. 9, 1979

[30] Foreign Application Priority Data

Dec. 12, 1978 [DK] Denmark .......................... 55791/78

[51] Int. Cl.³ ............................................ A01B 63/10
[52] U.S. Cl. ..................................... 172/776; 172/456; 172/466
[58] Field of Search ............... 172/311, 456, 446, 776, 172/466, 451

[56] References Cited

U.S. PATENT DOCUMENTS

| 3,650,333 | 3/1972 | Fueslein | 172/456 |
| 3,692,121 | 9/1972 | Kenney | 172/456 |
| 3,693,724 | 9/1972 | Fueslein | 172/456 |
| 3,713,495 | 1/1973 | Redford | 172/456 |
| 3,814,191 | 6/1974 | Tilbury | 172/311 |
| 3,944,001 | 3/1976 | Warner | 172/311 |
| 4,042,044 | 8/1977 | Honnold | 172/311 |
| 4,173,260 | 11/1979 | Lely | 172/311 |

Primary Examiner—Richard J. Johnson
Attorney, Agent, or Firm—O'Brien & Marks

[57] ABSTRACT

In an implement frame, particularly for an agricultural machine, comprising a central section and at least an end section or wing which is foldable between an extended operating position and a transport position substantially perpendicular thereto, the folding mechanism incorporates a first latch member for automatically arresting the end section in its extended position and a second latch member, associated with said first latch member, for automatically arresting the end section in its transport position.

3 Claims, 5 Drawing Figures

U.S. Patent
Feb. 23, 1982
4,316,511
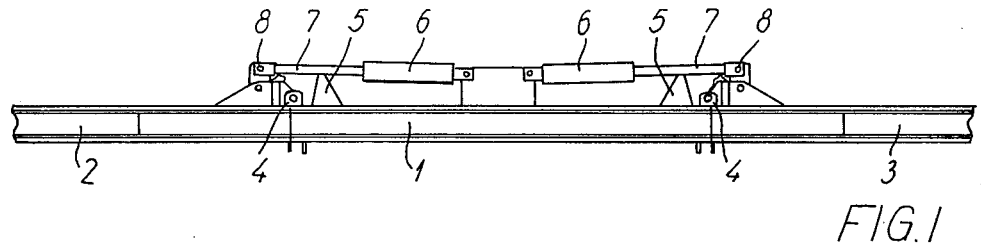
FIG.1
FIG.2
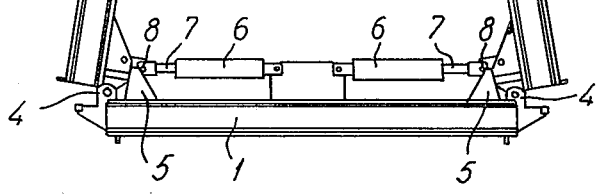
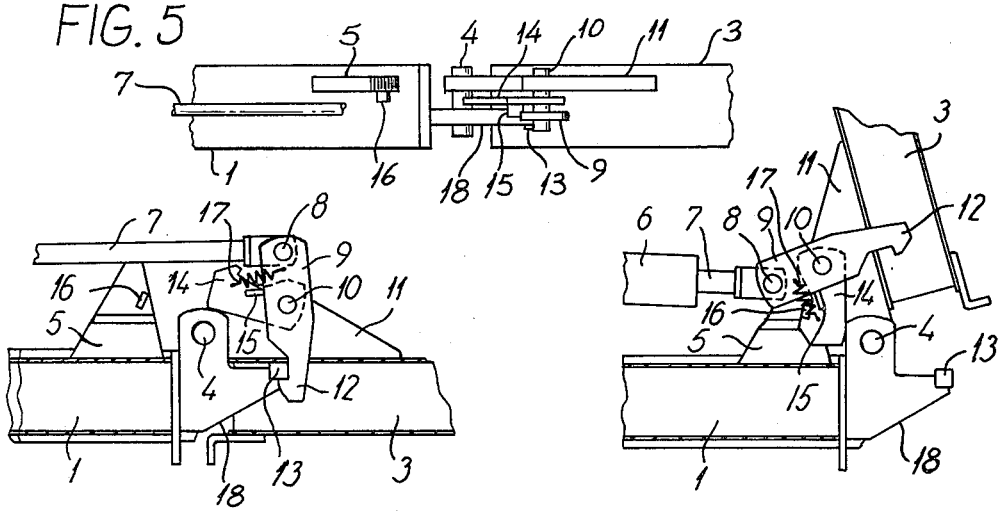
FIG.3
FIG.4
FIG.5

IMPLEMENT FRAME, ESPECIALLY FOR AGRICULTURAL MACHINES

Many agricultural implements to be mounted on a tractor, such as harrows, mowing machines and liquid sprayers, are provided with a frame in the form of a beam or bar comprising a central section for attachment to the tractor and two end sections or wings which are hydraulically foldable between an operating position in alignment with the central section and a transport position where the end sections extend substantially perpendicular to and normally upwardly from the central section.

As long as the hydraulic system is intact, it can be used not only for allowing an easy folding of the end sections between their two positions but also for locking them in each of these positions. There is, however, a certain risk for malfunctioning, for instance in case of rupture of tubing or valve defects, and for that reason the implements in question are normally provided with locking means to arrest the end sections, in any case in the transport position. These locking means may be in the form of simple bolts provided with safety devices which are inserted and removed as required. In many cases the operator fails, however, to use such locking means, either owing to an oversight or because they require additional manipulations which cannot take place from the driver's seat on the tractor. Normally, no harm is done thereby but in case of failure of the hydraulic system, an accident may happen causing personal injury as well as material damage.

U.S. Pat. No. 3,693,724 discloses a disc harrow having a bar frame of the above-mentioned type, except that the end sections or wings are arranged so as to fold 180° from the operating position to a transport position in which they rest safely on the central section and consequently require no locking in this position. As far as the operating position is concerned, the above-mentioned element of risk is eliminated by providing the end section, in the vicinity of its hinge connection with the central section, with a pivotable latch member, one end of which is connected to a push-pull rod for folding the end section and the other end forming a hook which, at the end of the folding movement of the end section towards the operating position, engages with a stop on the central section and thereby prevents the end section from folding back until a pulling force is exerted on said rod.

If the end sections in the transport position extend mainly perpendicular to the central section, as mentioned above, a locking in this position is also necessary, and starting from the structure disclosed in the U.S. specification, the present invention provides a solution of this problem.

More specifically, the invention relates to an implement frame, particularly for agricultural machines, which in a known manner comprises a main section to be mounted on a tractor or another vehicle and at least one end section which is hinged to the main section and by means of a driving cylinder is foldable between an operating position in which it is in alignment with the main section and a transport position approximately perpendicular thereto, a latch member being provided for arresting the end section in its operating position, said latch member being pivotally mounted on said end section at a distance from the axis of its hinge connection with the main section and being, at one end, pivotally connected with the piston rod of the driving cylinder and forming, at its other end, a hook arranged for engagement with a stop on the main section, when the end section is folded into its operating position, and for disengagement on retraction of the piston rod. According to the invention, such an implement frame is characterized in that for arresting the end section in its transport position, provision is further made of a second latch member associated with the first latch member and arranged for engagement with a corresponding stop on the main section at the end of the movement of the end section towards its transport position, and for disengagement therefrom when pressure is exerted on the first latch member through the piston rod.

As it will appear in more detail from the following explanation with reference to the drawing, the folding movements of the end section or wing originating in a manner known per se from the driving cylinder will automatically begin with a release of the latch member which is in engagement and they will end with the engagement of the other latch member. Furthermore, each latch member remains in engagement as long as it has not received from the driving cylinder a positive release impulse, and also the locking or arresting in the transport position will, therefore, remain effective even in case of intentional or unintentional interruption of the hydraulic pressure, for instance as a result of breakage of a hydraulic conduit.

The coordination of function of the two latch members can conveniently be ensured by mounting the latch members rotatably about one and the same axis in relation to the end section and by urging the second latch member by means of a spring against a predetermined basic position in relation to the first latch member, corresponding to the angular position of the two latch members when the end section is locked in the transport position.

An embodiment of the implement frame according to the invention with some details omitted is shown in the drawing, where FIGS. 1 and 2 show the complete frame in its operating position and transport position, respectively, FIGS. 3 and 4 show corresponding views of the connection between the main section of the frame and its right end section or wing, and FIG. 5 is a plan view of FIG. 3 with certain details omitted.

The implement frame or bar shown in FIGS. 1 and 2 comprises a central or main section 1 which in a manner not shown in detail can be mounted on a tractor having a hydraulic pump, and two end sections or wings 2 and 3 which through hinge pins 4 are connected with a bracket 18 fixed to the main section so that they can be folded from the operating position of FIG. 1 to the transport position of FIG. 2. In this latter position, the end sections can rest against fixed abutments 5 on the main section 1. The folding of the end sections is effected by means of hydraulic driving cylinders 6 carried by the main section 1, the piston rods 7 of said cylinders being through hinge pins 8 connected with their respective end section 2 and 3.

As it appears from FIGS. 3 and 4, the hinge pins 8 are, however, not carried directly by the end sections but in the rearmost part of a latch member 9 journalled on a shaft 10 in a bracket 11 which is fixedly connected with the end section 3 of the frame and forms a bearing for the hinge pin 4. The other, or foremost, end of the latch member 9 forms a hook 12 which in the operating position, FIG. 3, is in engagement with a stop 13 on the main section 1 and thereby locks the end section 3 in the horizontal position. By a retraction of the piston rod 7, the hook 12 is released from this engagement, whereafter a continued retraction of the piston rod causes the end section 3 to fold upwards to the position shown in FIG. 4.

Associated with the latch member 9 is a further or second latch member 14 which in the embodiment shown is also journaled on the shaft 10. This second latch member is, by means of a spring 17, FIGS. 3 and 4 urged clockwise and carries a cam 15 which by abutment against the front or lower edge of the latch member 9 is normally arrested in a basic position in relation to this latch. At the end of the upward movement of the end section 3, the hook part of the latch member 14 engages with a stop 16 on the main section 1 so as to prevent the end section from folding back, until the piston rod 7 is actuated to provide an extension stroke. Such a displacement results first in a limited counterclockwise rotation of the latch member 9, whereby the latch 14 is carried along by the cam 15 and thus is brought out of engagement with the stop 16, whereafter a continued push from the piston rod 7 is transmitted through the latch member 9 to the end section 3 and causes it to be folded from the transport position of FIG. 4 to the operating position of FIG. 3, in which the end section is again automatically locked, namely by engagement of the hook 12 with the stop 13.

I claim:

1. An implement frame, particularly for agricultural machines, comprising a main section to be mounted on a tractor or another vehicle;

at least one end section or wing which is hinged to the main section and by means of a driving cylinder is foldable between an operating position in which it is in alignment with this main section and a transport position approximately perpendicular thereto;

first and second stops secured to said main section; and first and second latch members for arresting the end section in its operating and transport positions, respectively, said first latch member being pivotally mounted on said end section at a distance from the axis of its hinge connection with the main section and being, at one end, pivotally connected with the piston rod of the driving cylinder and forming, at its other end, a hook arranged for engagement with a stop on the main section, when the end section is folded into its operating position, and for disengagement on retraction of the piston rod, and said second latch member being hingedly connected with the first latch member so as to engage said second stop on the main section at the end of the movement of the end section toward its transport position and to disengage therefrom when pressure is exerted on the first latch member through the piston rod, wherein both latch members are are journaled on a common axis in relation to the end section, and that the second latch member by means of a spring is urged against a predetermined basic position in relation to the first latch member corresponding to the mutual angular position of the two latch members, when the end section is arrested in its transport position.

2. An implement frame, particularly for agricultural machines, comprising a main section to be mounted on a tractor or another vehicle;

at least one end section or wing which is hinged to the main section and by means of a driving cylinder is foldable between an operating position in which it is in alignment with this main section and a transport position approximately perpendicular thereto;

first and second stops secured to said main section; and first and second latch members for arresting the end section in its operating and transport positions, respectively, said first latch member being pivotally mounted on said end section at a distance from the axis of its hinge connection with the main section and being, at one end, pivotally connected with the piston rod of the driving cylinder and forming, at its other end, a hook arranged for engagement with a stop on the main section, when the end section is folded into its operating position, and for disengagement on retraction of the piston rod, and said second latch member being hingedly connected with the first latch member so as to engage said second stop on the main section at the end of the movement of the end section toward its transport position and to disengage therefrom when pressure is exerted on the first latch member through the piston rod, and spring means extending between said first and second latch member for biasing the second latch member toward said second stop when the end section is in its transport position.

3. An implement frame according to claim 1 or 2 further including a cam attached to said second latch member, said cam being positioned to abut said first latch member whereby said second latch member can be disengaged from said second stop by applying pressure to said piston rod.

* * * * *